United States Patent
Nakamura et al.

(10) Patent No.: US 11,227,580 B2
(45) Date of Patent: Jan. 18, 2022

(54) SPEECH RECOGNITION ACCURACY DETERIORATION FACTOR ESTIMATION DEVICE, SPEECH RECOGNITION ACCURACY DETERIORATION FACTOR ESTIMATION METHOD, AND PROGRAM

(71) Applicant: NIPPON TELEGRAPH AND TELEPHONE CORPORATION, Tokyo (JP)

(72) Inventors: Takashi Nakamura, Tokyo (JP); Takaaki Fukutomi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/968,120

(22) PCT Filed: Feb. 6, 2019

(86) PCT No.: PCT/JP2019/004149
§ 371 (c)(1),
(2) Date: Aug. 6, 2020

(87) PCT Pub. No.: WO2019/156101
PCT Pub. Date: Aug. 15, 2019

(65) Prior Publication Data
US 2021/0035553 A1 Feb. 4, 2021

(30) Foreign Application Priority Data
Feb. 8, 2018 (JP) .............................. JP2018-021030

(51) Int. Cl.
*G10L 15/02* (2006.01)
*G10L 15/01* (2013.01)
*G10L 15/22* (2006.01)

(52) U.S. Cl.
CPC .............. *G10L 15/02* (2013.01); *G10L 15/01* (2013.01); *G10L 15/22* (2013.01)

(58) Field of Classification Search
CPC ........ G10L 15/02; G10L 15/063; G10L 15/22
See application file for complete search history.

(56) References Cited

U.S. PATENT DOCUMENTS 7,149,687 B1 * 12/2006 Gorin .................... G10L 15/063
704/243
7,451,083 B2 * 11/2008 Frey ........................ G10L 15/02
704/233

(Continued)

OTHER PUBLICATIONS

Asami, Taichi, et al., "Recurrent Out-of-Vocabulary Word Detection Using Distribution of Features," Interspeech 2016 Sep. 8-12, 2016, San Francisco, USA, ISCA, htt;://dx.doi.org/10.21437/Interspeech.2016-562.

(Continued)

*Primary Examiner* — Jakieda R Jackson

(57) ABSTRACT

The present invention provides a device for estimating the deterioration factor of speech recognition accuracy by estimating an acoustic factor that leads to a speech recognition error. The device extracts an acoustic feature amount for each frame from an input speech, calculates a posterior probability for each acoustic event for the acoustic feature amount for each frame, corrects the posterior probability by filtering the posterior probability for each acoustic event using a time-series filter with weighting coefficients developed in the time axis, outputs a set of speech recognition results with a recognition score, outputs a feature amount for the speech recognition results for each frame, calculates and outputs a principal deterioration factor class for the speech recognition accuracy for each frame on the basis of the corrected posterior probability, the feature amount for (Continued)

speech recognition results for each frame, and the acoustic feature amount for each frame.

20 Claims, 4 Drawing Sheets

(56) References Cited

U.S. PATENT DOCUMENTS

| | | | | |
|---|---|---|---|---|
| 8,131,543 | B1* | 3/2012 | Weiss | G10L 25/78 704/233 |
| 9,202,464 | B1* | 12/2015 | Senior | G06N 3/02 |
| 2003/0204394 | A1* | 10/2003 | Garudadri | G10L 15/32 704/201 |
| 2005/0228649 | A1* | 10/2005 | Harb | G10L 15/00 704/205 |
| 2007/0219797 | A1* | 9/2007 | Liu | G10L 15/08 704/257 |
| 2012/0278061 | A1* | 11/2012 | Weinstein | G10L 15/063 704/2 |
| 2013/0253930 | A1* | 9/2013 | Seltzer | G10L 15/063 704/236 |
| 2014/0278390 | A1* | 9/2014 | Kingsbury | G10L 25/54 704/232 |
| 2015/0100312 | A1* | 4/2015 | Bocchieri | G10L 15/20 704/232 |
| 2015/0172831 | A1* | 6/2015 | Dittberner | H04R 25/70 381/314 |
| 2016/0049915 | A1* | 2/2016 | Wang | H03G 3/32 381/107 |
| 2016/0056787 | A1* | 2/2016 | Lu | G10H 1/46 381/101 |
| 2016/0078879 | A1* | 3/2016 | Lu | G10L 21/02 381/56 |
| 2016/0189730 | A1* | 6/2016 | Du | G10L 21/0272 704/233 |
| 2016/0275964 | A1* | 9/2016 | Kim | G10L 15/20 |
| 2016/0358606 | A1* | 12/2016 | Ramprashad | G10L 15/32 |
| 2017/0061969 | A1* | 3/2017 | Thornburg | G10L 25/51 |
| 2017/0243113 | A1* | 8/2017 | Fukuda | G06N 3/0454 |
| 2018/0025721 | A1* | 1/2018 | Li | G06N 3/08 704/232 |
| 2018/0053502 | A1* | 2/2018 | Biadsy | G10L 15/32 |

OTHER PUBLICATIONS

Satoshi, Kaki, et al., "Speech Recognition Error Correction Method Using Statistical Features of Character Chains," A Collection of Essays presented at the 4th Annual Meeting of the Society of Language Processing, Mar. 1998.

Madikeri, Srikanth R., "Mel Filter Bank Energy-Based Slope Feature and Its Application to Speaker Recognition," 978-1-61284-091-811/2011 IEEE Jan. 28, 2011.

* cited by examiner

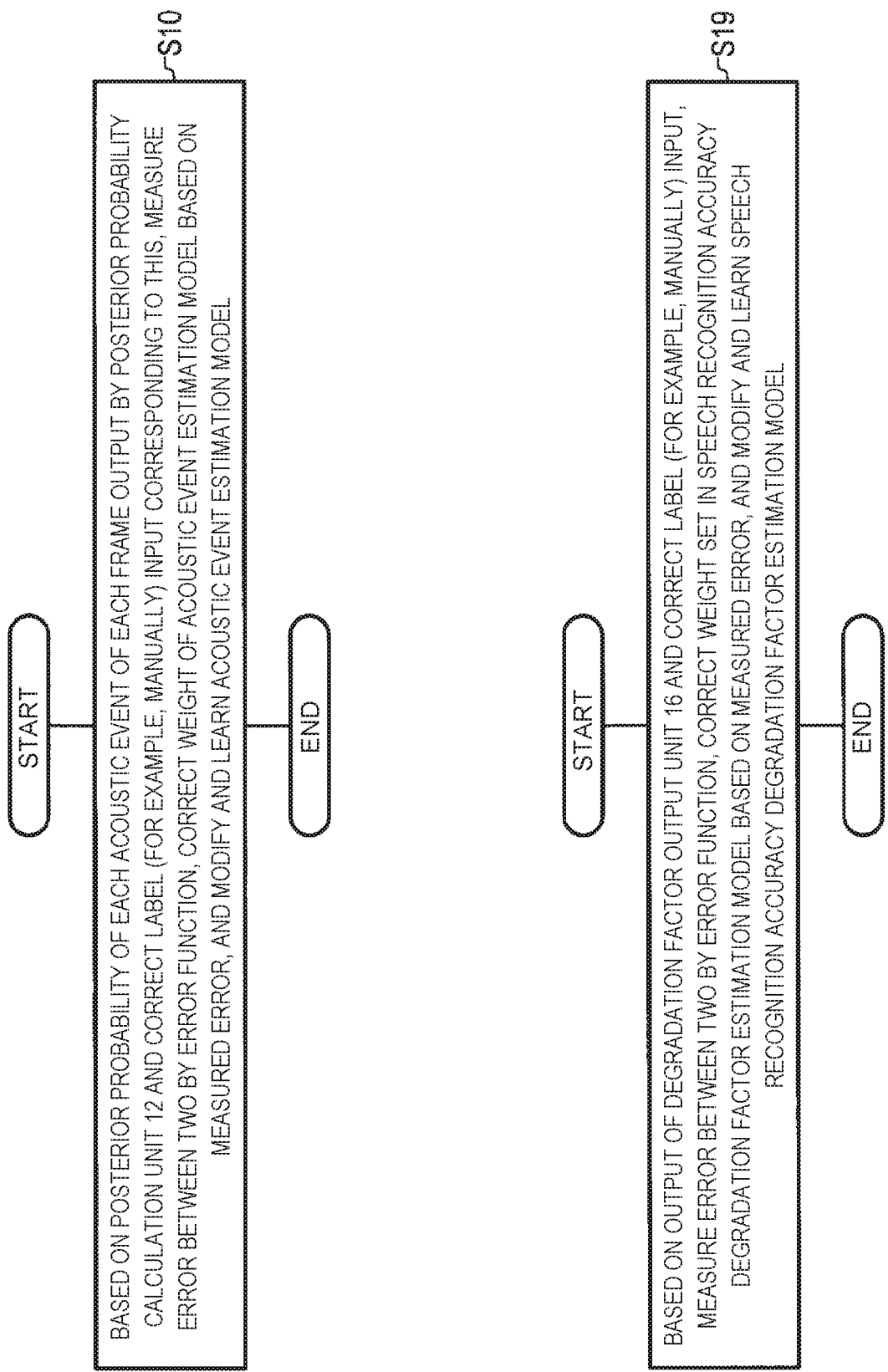

SPEECH RECOGNITION ACCURACY DETERIORATION FACTOR ESTIMATION DEVICE, SPEECH RECOGNITION ACCURACY DETERIORATION FACTOR ESTIMATION METHOD, AND PROGRAM

CROSS-REFERENCE TO RELATED APPLICATIONS

This application is a U.S. 371 Application of International Patent Application No. PCT/JP2019/004149, filed on 6 Feb. 2019, which application claims priority to and the benefit of JP Application No. 2018-021030, filed on 8 Feb. 2018, the disclosures of which are hereby incorporated herein by reference in their entireties.

TECHNICAL FIELD

The present invention relates to a speech recognition accuracy degradation factor estimation device that estimates an acoustic factor leading to a speech recognition error, a speech recognition accuracy degradation factor estimation method for the same, and a program.

BACKGROUND ART

There has been proposed a method of detecting and correcting the causes of speech recognition errors such as unknown words and homonyms (Non-Patent Literatures 1 and 2).

CITATION LIST

Non-Patent Literature

Non-Patent Literature 1: Taichi Asami, Ryo Masumura, Yushi Aono, Koichi Shinoda, "Recurrent Out-of-Vocabulary Word Detection Using Distribution of Features", [online], September 2016, ISCA, [Searched on May 18, 2017], Internet <URL: http://t2r2.star.titech.ac.jp/rrws/file/CTT100716848/ATD100000413/>

Non-Patent Literature 2: Satoshi Kaki, Eiichiro Sumita, Hitoshi Iida, "A Method for Correcting Errors in Speech Recognition Using the Statistical Features of Character Co-occurrence", [online], March 1998, Language Processing Society of Japan, [Searched on May 18, 2017], Internet <URL: http://www.anlp.jp/proceedings/annual_meeting/1998/pdf_dir/Q1-5.pdf>

Non-Patent Literature 3: Srikanth R Madikeri, Hema A Murthy, "Mel filter bank energy-based slope feature and its application to speaker recognition", [online], January 2011, ISCA, [Searched on May 18, 2017], Internet <URL: http://ieeexplore.ieee.org/abstract/document/5734713/>

SUMMARY OF INVENTION

Technical Problem

Non-Patent Literature 1 performs phoneme recognition and word recognition in parallel to detect unknown words using a feature quantity of each transition of a confusion network generated by word recognition, but speech recognition is always required and what can be detected is limited to unknown words. Non-Patent Literature 2 typifies the speech recognition error patterns and corrects the portions corresponding to the patterns but can handle only the linguistic error pattern.

Accordingly, an object of the present invention is to provide a speech recognition accuracy degradation factor estimation device that can estimate an acoustic factor leading to a speech recognition error.

Means for Solving the Problems

A speech recognition accuracy degradation factor estimation device of the present invention includes an acoustic feature quantity extraction unit, a posterior probability calculation unit, a filtering unit, a speech recognition unit, a speech recognition result feature quantity extraction unit, and a degradation factor output unit.

The acoustic feature quantity extraction unit extracts an acoustic feature quantity of each frame from an input speech. The posterior probability calculation unit calculates a posterior probability of each acoustic event of the acoustic feature quantity of each frame based on a plurality of acoustic events preliminarily classified into one of a degradation factor class and a non-degradation factor class. The filtering unit uses a time-series filter which is a filter having weighting coefficients developed in a time direction to perform filtering on the posterior probability of each acoustic event to obtain a corrected posterior probability. The speech recognition unit performs speech recognition on the input speech and outputs a set of speech recognition results with recognition scores. The speech recognition result feature quantity extraction unit converts the word notation and the part of speech of each word in the set of speech recognition results with recognition scores into a word-part-of-speech vector represented by a distributed expression, concatenates each numerical value of the recognition scores to the word-part-of-speech vector to obtain a speech recognition result feature quantity, and outputs the speech recognition result feature quantity for each frame. The degradation factor output unit calculates and outputs a main degradation factor class of speech recognition accuracy for each frame based on the corrected posterior probability, the speech recognition result feature quantity of each frame, and the acoustic feature quantity of each frame.

Effects of the Invention

The speech recognition accuracy degradation factor estimation device of the present invention can estimate an acoustic factor leading to a speech recognition error.

BRIEF DESCRIPTION OF DRAWINGS

FIG. 4 is a flowchart illustrating an operation of a first model learning unit and a second model learning unit.

DETAILED DESCRIPTION OF THE INVENTION

Figure 1:
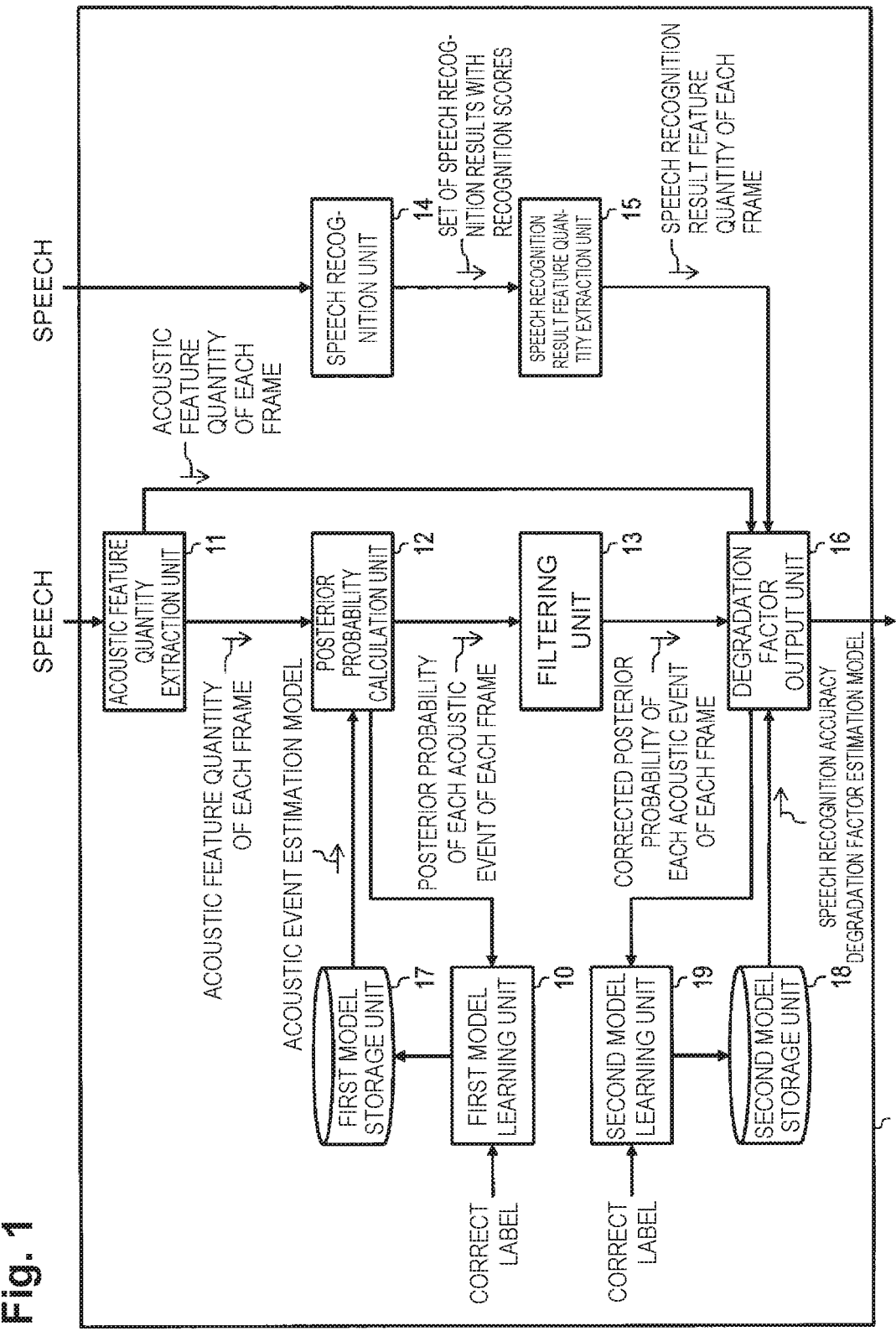
FIG. 1 is a block diagram illustrating a configuration of a speech recognition accuracy degradation factor estimation device of a first embodiment.

Hereinafter, embodiments of the present invention will be described in detail. It should be noted that the same reference numerals or characters are assigned to the configuration units having the same function and the duplicate description is omitted.

First Embodiment

Figure 2:
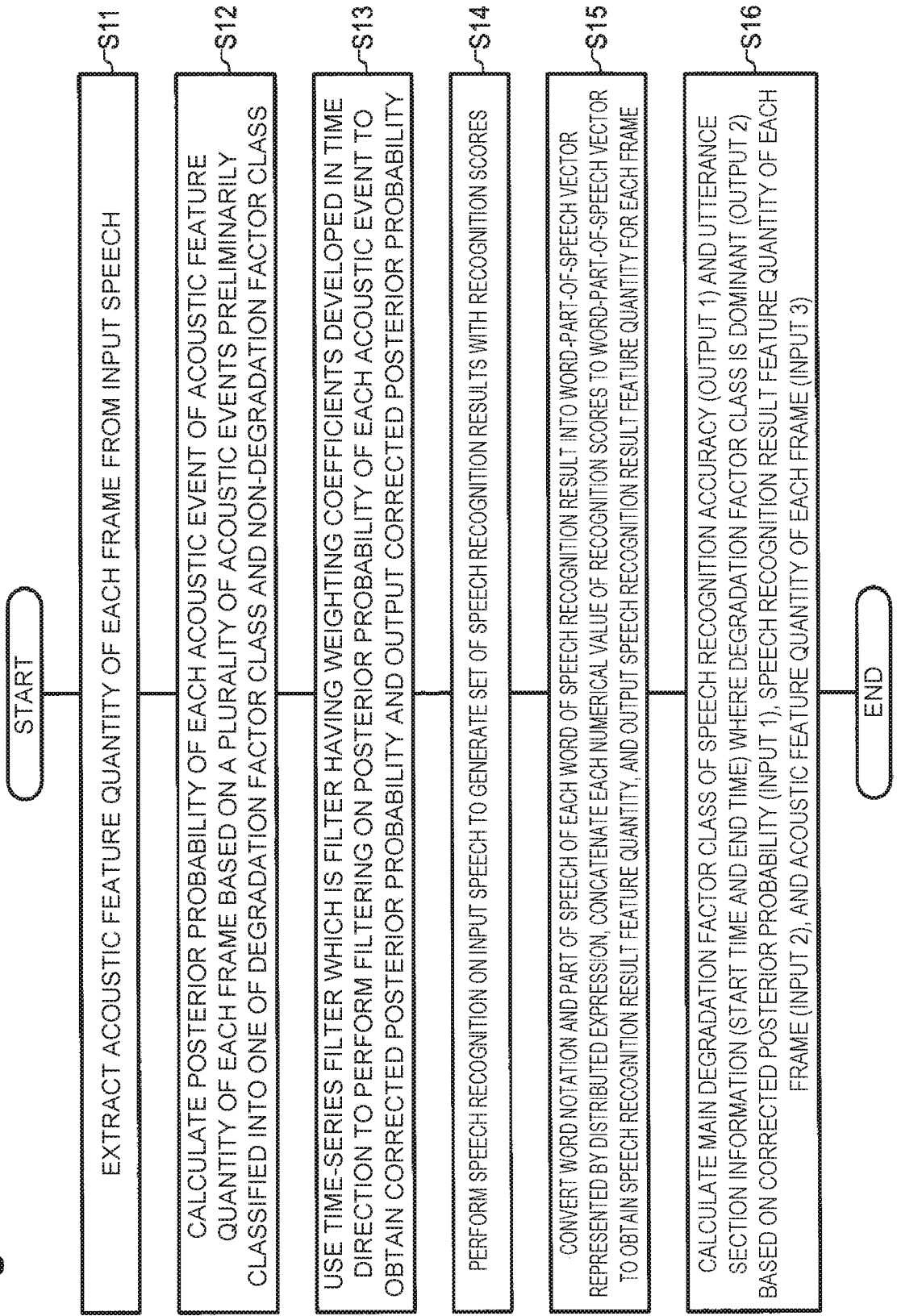
FIG. 2 is a flowchart illustrating an operation of the speech recognition accuracy degradation factor estimation device of the first embodiment.

Hereinafter, with reference to FIG. 1, a configuration of a speech recognition accuracy degradation factor estimation device of a first embodiment will be described. As illustrated in the drawing, the speech recognition accuracy degradation factor estimation device 1 of the present embodiment includes an acoustic feature quantity extraction unit 11, a posterior probability calculation unit 12, a filtering unit 13, a speech recognition unit 14, a speech recognition result feature quantity extraction unit 15, a degradation factor output unit 16, a first model storage unit 17, a second model storage unit 18, a first model learning unit 10, and a second model learning unit 19. Hereinafter, with reference to FIG. 2, the operation of each constituent component will be described in detail.

<Acoustic Feature Quantity Extraction Unit 11>
Input: Speech
Output: Acoustic feature quantity of each frame
Process: The acoustic feature quantity extraction unit 11 extracts an acoustic feature quantity of each frame from an input speech (S11). For example, the acoustic feature quantity extraction unit 11 extracts an acoustic feature quantity of each frame by a known technique described in Non-Patent Literature 3.

<<Definition of the Term: Frame>>
Acoustic analysis of input speech often assumes that a waveform to be analyzed has a certain property, that is, the property does not change between the start and end of the waveform to be analyzed. Therefore, it is assumed that the speech waveform to be analyzed is extracted in a very short time span so that the speech has the same property in such a very short time span. The time span as used herein often uses a value such as 20 to 30 milliseconds.

When the speech is extracted in a short time span as described above, for the purpose of avoiding sudden changes in acoustic analysis result and continuously changing the acoustic analysis result, the extracted position is shifted by a span shorter than the time span thereby to overlap a part of the extracted speech waveform and to cause a common speech waveform to be included in the overlapped portion. At this time, the time span to be shifted is often called a frame shift. A value such as 10 to 15 milliseconds is often used as the frame shift. See FIG. 1 in Non-Patent Literature 3.

<Posterior Probability Calculation Unit 12>
Input: Acoustic feature quantity of each frame of the entire utterance in the input speech
Output: Posterior probability of each acoustic event of each frame
Process: The posterior probability calculation unit 12 calculates a posterior probability of each acoustic event of the acoustic feature quantity of each frame based on a plurality of acoustic events preliminarily classified into one of a degradation factor class and a non-degradation factor class (S12). The posterior probability calculation unit 12 is a model that has been learned in advance by a first model learning unit 10 to be described later. The posterior probability calculation unit 12 inputs the acoustic feature quantity of each frame in the acoustic event estimation model that has been stored in the first model storage unit 17, and calculates and outputs the posterior probability of each acoustic event for each frame.

Examples of acoustic events include those in the following table.

TABLE 1

| | |
|---|---|
| acoustic events | in-car noise with speech present |
| | TV noise with speech present |
| | BGM (without singing voice) with speech present |
| | very low volume |
| | very high volume |
| | fast talking |
| | clean speech |

The acoustic events are assumed to be preliminarily classified into one of the degradation factor class that is considered to be a factor that has a negative effect on speech recognition (that reduces recognition accuracy) and the non-degradation factor class that is considered to be a factor that does not have a negative effect on speech recognition.

In the example of the acoustic event shown in the above table, each acoustic event is classified as follows.

TABLE 2

| | |
|---|---|
| Acoustic events classified into degradation factor class | TV noise with speech present |
| | BGM (without singing voice) with speech present |
| | very low volume |
| | very high volume |
| | fast talking |
| Acoustic events classified into non-degradation factor class | in-car noise with speech present |
| | clean speech |

Examples of the acoustic event estimation model may include a Deep neural network (DNN), a Convolutional neural network (CNN), and a Gaussian mixture model.

<Filtering Unit 13>
Input: Posterior probability of each acoustic event of each frame
Output: Corrected posterior probability of each acoustic event of each frame
Process: The filtering unit 13 uses a time-series filter which is a filter having weighting coefficients developed in the time direction to perform filtering on the posterior probability of each acoustic event to obtain a corrected posterior probability, and outputs this corrected posterior probability (S13). The filtering unit 13 performs time-series filtering on the posterior probability of each acoustic event calculated by the posterior probability calculation unit 12, for each event.

A specific procedure of the filtering unit 13 includes the following method. First, the filtering unit 13 sets a filter window for an entire utterance section (entire input speech). The filter window sets a time span shorter than the entire utterance section (for example, 10 times the frame shift length). Then, the filtering unit 13 acquires a posterior probability of each frame included in the filter window. When applied to the above example, this is a value of the posterior probability for 10 frames=10 posterior probabilities. The filtering unit 13 performs a time-series filter on the acquired posterior probability of each acoustic event. As used herein, the time series filter is a filter having weighting coefficients developed in the time direction, and examples thereof may include a moving average filter and a median filter.

In the above method, a frame shorter than the filter window length may occur at the beginning and end of the utterance section. In such a case, the filtering unit 13 performs the following processing thereby to avoid a state where filtering cannot be performed. Beginning of utterance: The posterior probability of the first frame is copied, and the copied value is used for the portion shorter than the filter window length. End of utterance: The posterior probability of the last frame is copied, and the copied value is used for the portion shorter than the filter window length.

<Speech Recognition Unit 14>
Input: Speech
Output: A set of speech recognition results with recognition scores
Process: The speech recognition unit 14 performs speech recognition on an input speech (the same speech as the speech used in S11) to generate a set of speech recognition results with recognition scores (SLY). Each word of each speech recognition result is assumed to have a word notation, a part-of-speech, recognition scores (reliability, acoustic score, language score), a word start time, and a word end time.

<Speech Recognition Result Feature Quantity Extraction Unit 15>
Input: A set of speech recognition results with recognition scores
Output: Speech recognition result feature quantity of each frame
Process: The speech recognition result feature quantity extraction unit 15 converts the word notation and the part of speech of each word in a set of speech recognition results with recognition scores into a word-part-of-speech vector represented by a distributed expression, concatenates each numerical value of the recognition scores to the word-part-of-speech vector to obtain a speech recognition result feature quantity, and outputs the speech recognition result feature quantity for each frame (S15). Note that the word-part-of-speech vector has the same value between frames in which the word continues. Note also that steps SLY and S15 described above can be performed in parallel with steps S11 to S13.

<Degradation Factor Output Unit 16>
Input 1: Corrected posterior probability of each acoustic event of each frame
Input 2: Speech recognition result feature quantity of each frame
Input 3: Acoustic feature quantity of each frame
Output 1: Main degradation factor class of speech recognition accuracy (label thereof)
Output 2: Utterance section information (start time and end time) where the degradation factor class is dominant Process: Based on the corrected posterior probability (Input 1), the speech recognition result feature quantity of each frame (Input 2), and the acoustic feature quantity of each frame (Input 3) subjected to time-series filtering in step S13, the degradation factor output unit 16 calculates and outputs the main degradation factor class of speech recognition accuracy (Output 1) and the utterance section information (start time and end time) where the degradation factor class is dominant (Output 2) for frame (S16). Specifically, the degradation factor output unit 16 concatenates and inputs Input 1, Input 2, Input 3 to and into a statistical model (hereinafter referred to as a speech recognition accuracy degradation factor estimation model) such as a deep neural network (DNN) and a long short-term memory (LSTM) which is preliminarily learned by a second model learning unit 19 to be described later (see FIG. 3) and outputs the degradation factor class having the highest posterior probability as the output 1. Further, when the output 1 continuously has the same class over a predetermined frame, information of the section is output as the output 2.

<First Model Learning Unit 10>
As illustrated in FIG. 4, based on the posterior probability of each acoustic event of each frame output by the posterior probability calculation unit 12 and a correct label (for example, manually) input corresponding to this, the first model learning unit 10 measures an error between the two by an error function, corrects the weight of the acoustic event estimation model based on the measured error, and modifies and learns the acoustic event estimation model (S10). It is assumed that the model learning operation in step S10 has been preliminarily performed before step S12.

Figure 3:
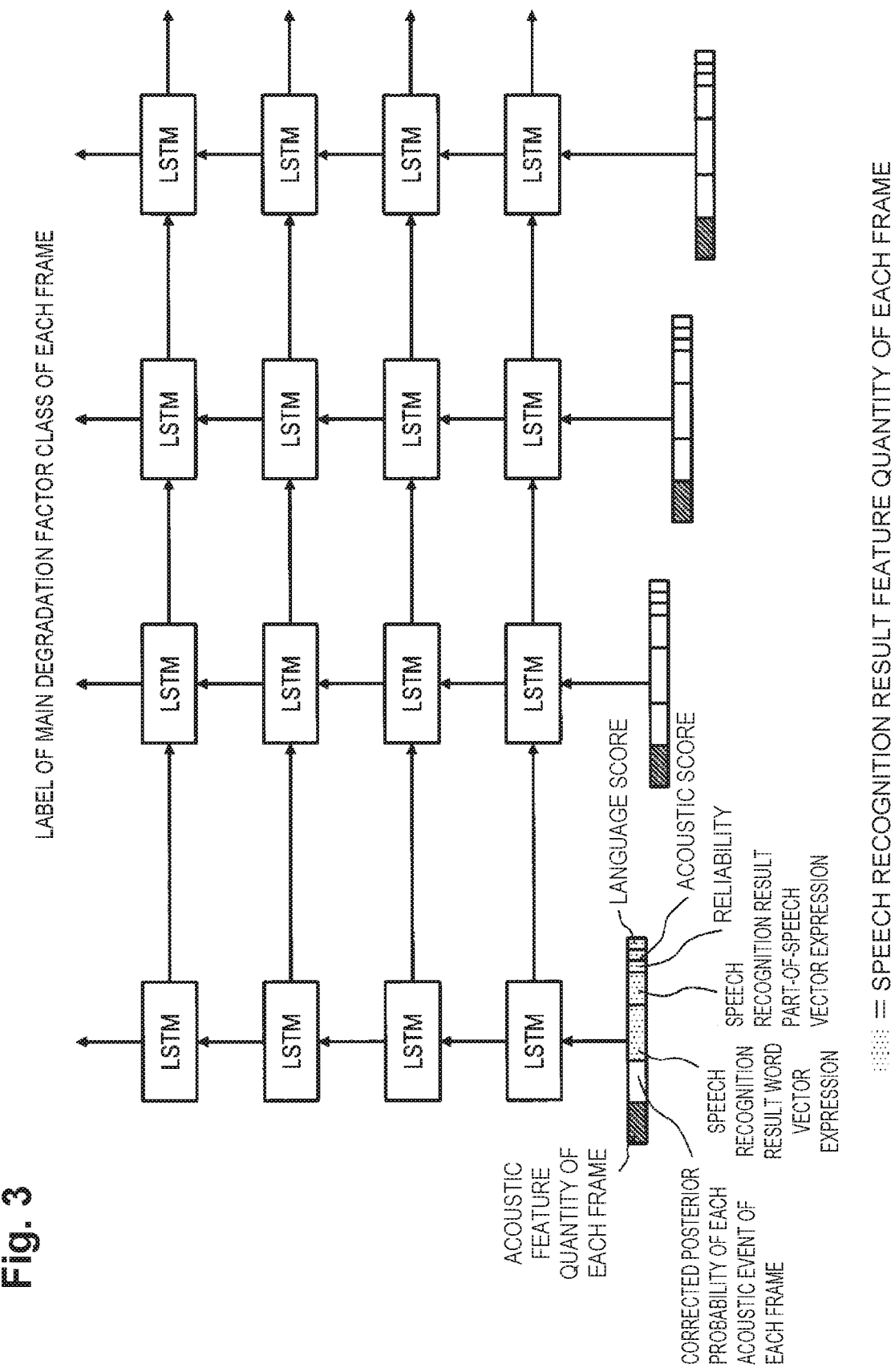
FIG. 3 is a view illustrating a structure example of a speech recognition accuracy degradation factor estimation model.

<Second Model Learning Unit 19>
As illustrated in the drawing, based on the output of the degradation factor output unit 16 and a correct label (for example, manually) input, the second model learning unit 19 measures an error between the two by an error function, corrects the weight set in the speech recognition accuracy degradation factor estimation model based on the measured error, and modifies and learns the speech recognition accuracy degradation factor estimation model (S19). It is assumed that the model learning operation in step S19 has been preliminarily performed before step S16. FIG. 3 illustrates a structure example of the speech recognition accuracy degradation factor estimation model.

<Effects>
The speech recognition accuracy degradation factor estimation device 1 of the present embodiment estimates the factor that degrades the speech recognition accuracy from the speech feature, and thus has the following effects.
1) The reliability of the estimated accuracy degradation factor can be evaluated by considering the score of the speech recognition result, and thus a more appropriate degradation factor can be presented.
2) The improvement of the correct answer rate of the speech recognition can be expected when the speech is uttered again by presenting the degradation factor to the user.
3) The improvement of the accuracy of search or the like using speech recognition results can be expected by excluding the results that are estimated to include speech recognition errors.

<Supplementary Note>
The device according to the present invention comprises, for example, an input unit to which a keyboard or the like can be connected as a single hardware entity; an output unit to which a liquid crystal display or the like can be connected; a communication unit that can be connected to a communication device (for example, a communication cable) which can communicate outside the hardware entity; a central processing unit (CPU) (which may include a cache memory, a register, and the like); a RAM or ROM which is a memory; and an external storage device which is a hard disk drive. Further, the device of the present invention has a bus connected so that data can be exchanged among the input unit, the output unit, the communication unit, the CPU, the RAM, the ROM, and the external storage device. Furthermore, the hardware entity may be provided with a device (drive) that can read and write a recording medium such as a CD-ROM as needed. Example of the physical entity provided with such hardware resources includes a general-purpose computer.

The external storage device of the hardware entity stores programs necessary for implementing the above-described functions and data required for processing of the programs (without being limited to the external storage device, for example, the programs may be stored in a ROM that is a read-only storage device). Data obtained by the processing of these programs is appropriately stored in a RAM, an external storage device, or the like.

In the hardware entity, each program stored in the external storage device (ROM or the like) and data necessary for processing of each program are read into memory as needed, and interpreted, executed, and processed by the CPU as needed. As a result, the CPU implements a predetermined function (each constituent component described above as the . . . unit, . . . device, and the like).

The present invention is not limited to the above-described embodiments, and can be appropriately modified without departing from the spirit and scope of the present invention. The processes described in the above embodiments may be performed not only in chronological order according to the order of description, but also in parallel or individually as required depending on the processing capability of the device that performs the processes or as necessary.

As described above, when the processing functions of the hardware entity (the device of the present invention) described in the above embodiments are implemented by a computer, the processing content of the functions that the hardware entity should have is written by a program. When this program is performed by the computer, the processing functions of the hardware entity are implemented on the computer.

The program in which the processing content is written can be recorded in a computer-readable recording medium. The computer-readable recording medium may be any recording medium such as a magnetic recording device, an optical disk drive, a magnetooptical recording medium, a semiconductor memory. Specifically, the examples of the magnetic recording device may include a hard disk drive, a flexible disk drive, and a magnetic tape drive; the examples of the optical disk drive may include a DVD (digital versatile disc) drive, a DVD-RAM (Random Access Memory), a CD-ROM (Compact Disc Read Only Memory), CD-R (Recordable)/RW (ReWritable); the examples of the magnetooptical recording medium may include an MO (Magneto-Optical disc); and the examples of the semiconductor memory may include an EEP-ROM (Electronically Erasable and Programmable-Read Only Memory).

Examples of distribution of this program include selling, transferring, and lending a portable recording medium such as a DVD or a CD-ROM on which the program is recorded. Another example may be configured such that the program is stored in a storage device of a server computer, and the program is distributed by transferring the program from the server computer to another computer via a network.

The computer that executes such a program, first, for example, temporarily stores the program recorded on a portable recording medium or the program transferred from a server computer in its own storage device. Then, when the processing is executed, the computer reads the program stored in its own recording medium and executes the processing according to the read program. Alternatively, the program may be executed such that the computer directly reads the program from the portable recording medium and executes the processing according to the program. Further alternatively each time a program is transferred from the server computer to the computer, the computer sequentially executes the processing according to the received program. Still further alternatively, another configuration may be such that the above-described processing is executed by a so-called ASP (Application Service Provider) type service that implements the processing function only by execution instruction and result acquisition without transferring the program from the server computer to the computer. It should be noted that the program described in the present embodiment includes information used for processing by a computer and which is similar to a program (such as data which is not a direct command to the computer but has a property defining the processing of the computer).

Further, the above embodiments have been described such that the hardware entity is configured by executing a predetermined program on a computer, but another configuration may be such that at least a part of the processing content is implemented by hardware.

The invention claimed is:

1. A computer-implemented method for estimating aspects of speech recognition, the method comprising:
   extracting an acoustic feature quantity of at least one frame from an input speech;
   generating a posterior probability of a plurality of acoustic events of the acoustic feature quantity of at least one frame based on the plurality of acoustic events classified into one of classes, the classes comprising a degradation factor class and a non-degradation factor class;
   generating a set of speech recognition results with recognition scores based on a speech recognition on the input speech;
   generating a word-part-of-speech-of-vector in a distributed representation based on a conversion of a word notation and a part of speech of one or more words in a set of speech recognition results with recognition scores;
   generating a speech recognition result feature quantity for the at least one frame based on a plurality of numerical values of the recognition scores to the word-part-of-speech vector;
   determining a main degradation factor class of speech recognition accuracy for the at least one frame based at least on:
      the posterior probability,
      the speech recognition result feature quantity of the at least one frame, and
      the acoustic feature quantity of the at least one frame; and
   providing the main degradation factor class.

2. The computer-implemented method of claim 1, the method further comprising:
   generating utterance section information, wherein the degradation factor class is dominant in the utterance section information.

3. The computer-implemented method of claim 1, the method further comprising:
   generating a corrected posterior probability based on the posterior probability of at least one of the plurality of acoustic events using a time-series filter, the time-series filter having weighting coefficients developed in a time direction; and
   determining the main degradation factor class of speech recognition accuracy for the at least one frame based on the corrected posterior probability, the speech recognition result feature quantity of the at least one frame, and the acoustic feature quantity of the at least one frame.

4. The computer-implemented method of claim 1, the method further comprising:
   generating the posterior probability using an acoustic event estimation model based on machine learning.

5. The computer-implemented method of claim 1, the method further comprising:

generating the main degradation factor class using a machine learning model for estimating degradation factors of accuracy in speech recognition.

6. The computer-implemented method of claim 1, wherein at least one of the plurality of acoustic events comprise:
    in-car noise with speech present,
    TV noise with speech present, and
    a level of sound volume outside a predetermined range of volume.

7. The computer-implemented method of claim 1, wherein the degradation factor class of the acoustic events causes a degradation of speech recognition, the degradation factor class comprising one or more of:
    TV noise with speech present, and
    the level of sound volume greater than a predetermined threshold, and wherein the non-degradation factor class of the acoustic events causes no degradation in speech recognition, the non-degradation factor class comprising:
    in-car noise with speech present.

8. A system for estimating aspects of speech recognition, the system comprising:
    a processor; and
    a memory storing computer executable instructions that when executed by the processor cause the system to:
        extract an acoustic feature quantity of at least one frame from an input speech;
        generate a posterior probability of a plurality of acoustic events of the acoustic feature quantity of at least one frame of based on the plurality of acoustic events classified into one of classes, the classes comprising a degradation factor class and a non-degradation factor class;
        generate a set of speech recognition results with recognition scores based on a speech recognition on the input speech;
        generate a word-part-of-speech-of-vector in a distributed representation based on a conversion of a word notation and a part of speech of one or more words in a set of speech recognition results with recognition scores;
        generate a speech recognition result feature quantity for the at least one frame based on a plurality of numerical values of the recognition scores to the word-part-of-speech vector to obtain a speech recognition result feature quantity;
        determine a main degradation factor class of speech recognition accuracy for the at least one frame based at least on:
            the posterior probability,
            the speech recognition result feature quantity of the at least one frame, and
            the acoustic feature quantity of the at least one frame; and
        provide the main degradation factor class.

9. The system of claim 8, the computer-executable instructions when executed further causing the system to:
    generate utterance section information, wherein the degradation factor class is dominant in the utterance section information.

10. The system of claim 8, the computer-executable instructions when executed further causing the system to: generate the posterior probability using an acoustic event estimation model based on machine learning.

11. The system of claim 8, the computer-executable instructions when executed further causing the system to:

generate the main degradation factor class using a machine learning model for estimating degradation factors of accuracy in speech recognition.

12. The system of claim 8, wherein at least one of the plurality of acoustic events comprise:
    in-car noise with speech present,
    TV noise with speech present, and
    a level of sound volume outside a predetermined range of volume.

13. The system of claim 8, wherein the degradation factor class of the acoustic events causes a degradation of speech recognition, the degradation factor class comprising one or more of:
    TV noise with speech present, and
    the level of sound volume greater than a predetermined threshold, and wherein the non-degradation factor class of the acoustic events causes no degradation in speech recognition, the non-degradation factor class comprising:
    in-car noise with speech present.

14. A computer-readable non-transitory recording medium storing computer-executable instructions that when executed by a processor cause a computer system to:
    extract an acoustic feature quantity of at least one frame from an input speech;
    generate a posterior probability of a plurality of acoustic events of the acoustic feature quantity of at least one frame of based on the plurality of acoustic events classified into one of classes, the classes comprising a degradation factor class and a non-degradation factor class;
    generate a set of speech recognition results with recognition scores based on a speech recognition on the input speech;
    generate a word-part-of-speech-of-vector in a distributed representation based on a conversion of a word notation and a part of speech of one or more words in a set of speech recognition results with recognition scores;
    generate a speech recognition result feature quantity for the at least one frame based on a plurality of numerical values of the recognition scores to the word-part-of-speech vector to obtain a speech recognition result feature quantity;
    determine a main degradation factor class of speech recognition accuracy for the at least one frame based at least on:
        the posterior probability,
        the speech recognition result feature quantity of the at least one frame, and
        the acoustic feature quantity of the at least one frame; and
    provide the main degradation factor class.

15. The computer-readable non-transitory recording medium of claim 14, the computer-executable instructions when executed further causing the system to:
    generate utterance section information, wherein the degradation factor class is dominant in the utterance section information.

16. The computer-readable non-transitory recording medium of claim 14, the computer-executable instructions when executed further causing the system to:
    generate a corrected posterior probability based on the posterior probability of at least one of the plurality of acoustic events using a time-series filter, the time-series filter having weighting coefficients developed in a time direction; and determine the main degradation factor class of speech recognition accuracy for the at least one frame based on the corrected posterior probability, the speech recognition result feature quantity of the at least one frame, and the acoustic feature quantity of the at least one frame.

17. The computer-readable non-transitory recording medium of claim 14, the computer-executable instructions when executed further causing the system to:
generate the posterior probability using an acoustic event estimation model based on machine learning.

18. The computer-readable non-transitory recording medium of claim 14, the computer-executable instructions when executed further causing the system to:
generate the main degradation factor class using a machine learning model for estimating degradation factors of accuracy in speech recognition.

19. The computer-readable non-transitory recording medium of claim 14, wherein at least one of the plurality of acoustic events comprise:

in-car noise with speech present,

TV noise with speech present, and a level of sound volume outside a predetermined range of volume.

20. The computer-readable non-transitory recording medium of claim 14, wherein the degradation factor class of the acoustic events causes a degradation of speech recognition, the degradation factor class comprising one or more of:

TV noise with speech present, and the level of sound volume greater than a predetermined threshold, and wherein the non-degradation factor class of the acoustic events causes no degradation in speech recognition, the non-degradation factor class comprising:

in-car noise with speech present.

* * * * *